US012605791B2

(12) United States Patent
Hoppe

(10) Patent No.: US 12,605,791 B2
(45) Date of Patent: Apr. 21, 2026

(54) LASER DEVICES AND METHODS FOR LASER METAL DEPOSITION

(71) Applicant: DIRECTEDMETAL 3D SL., Linares (ES)

(72) Inventor: Lukas Hoppe, Linares (ES)

(73) Assignee: DIRECTEDMETAL 3D SL, Linares (ES)

( * ) Notice: Subject to any disclaimer, the term of this patent is extended or adjusted under 35 U.S.C. 154(b) by 716 days.

(21) Appl. No.: 17/977,915

(22) Filed: Oct. 31, 2022

(65) Prior Publication Data

US 2024/0139877 A1 May 2, 2024

(51) Int. Cl.
| | |
|---|---|
| *B23K 26/342* | (2014.01) |
| *B22F 10/28* | (2021.01) |
| *B22F 10/36* | (2021.01) |
| *B22F 12/41* | (2021.01) |
| *B22F 12/53* | (2021.01) |
| *B22F 12/90* | (2021.01) |
| *B23K 26/03* | (2006.01) |
| *B33Y 10/00* | (2015.01) |
| *B33Y 30/00* | (2015.01) |
| *B33Y 50/02* | (2015.01) |

(52) U.S. Cl.
CPC ............ *B23K 26/342* (2015.10); *B22F 10/28* (2021.01); *B22F 10/36* (2021.01); *B22F 12/41* (2021.01); *B22F 12/53* (2021.01); *B22F 12/90* (2021.01); *B23K 26/032* (2013.01); *B33Y 10/00* (2014.12); *B33Y 30/00* (2014.12); *B33Y 50/02* (2014.12)

(58) Field of Classification Search
CPC .... B23K 26/342; B23K 26/032; B23Y 10/00; B23Y 30/00; B23Y 50/02; B22F 12/53; B22F 12/41; B22F 12/90; B22F 10/36; B22F 10/28
See application file for complete search history.

(56) References Cited

U.S. PATENT DOCUMENTS

| | | | |
|---|---|---|---|
| 2004/0133298 A1* | 7/2004 | Toyserkani ............. | B22F 10/80 219/121.61 |
| 2018/0124341 A1 | 5/2018 | Harding et al. | |
| 2019/0009358 A1 | 1/2019 | Vorontsov | |
| 2021/0402481 A1* | 12/2021 | Stecker ................... | B22F 10/28 |

* cited by examiner

*Primary Examiner* — Sabbir Hasan
(74) *Attorney, Agent, or Firm* — Squire Patton Boggs (US) LLP

(57) ABSTRACT

The present disclosure relates to laser devices for laser metal deposition and methods for laser metal deposition. A laser device for laser metal deposition on a substrate is disclosed. The laser device comprises: a delivery opening for delivering a wire or powder metallic feedstock to the substrate; a laser beam source configured to fuse the metallic feedstock with the substrate, the laser beam source being configured to emit a laser beam of a first power; a plurality of cameras configured to record images of a region of interest; and one or more light sources configured to illuminate the region of interest. The one or more light sources are configured to illuminate with a power of a blackbody radiation emitted during laser metal deposition.

9 Claims, 7 Drawing Sheets

50

DELIVERING METALLIC FEEDSTOCK   55

FUSING THE METALLIC FEEDSTOCK WITH A SUBSTRATE WITH A LASER BEAM OF A FIRST POWER   56

ILLUMINATING WITH A SECOND POWER HIGHER THAN A POWER OF BLACKBODY RADIATION   57

RECORDING IMAGES   58

LASER DEVICES AND METHODS FOR LASER METAL DEPOSITION

FIELD

The present disclosure relates to laser devices for laser metal deposition. The present disclosure further relates to methods for laser metal deposition. The present disclosure further relates to methods and systems for controlling laser metal deposition processes.

BACKGROUND

Additive manufacturing systems and processes allow the creation of three-dimensional (3D) components from a digital model by adding material, typically layer by layer. For example, computer-aided-design (CAD) software or 3D object scanners may be used to direct a nozzle or a print head of an additive manufacturing system to deposit material on a surface. As the deposited material cools or is cured, depending on the technique used, a 3D object with a specific shape is created.

Some additive manufacturing processes use a laser to melt a feedstock. One type of additive manufacturing process which uses a high-power laser as a heat source is laser metal deposition. In laser metal deposition, the feedstock is metallic, and the feedstock may be provided in powder or wire form. The laser beam heats the substrate and melts it locally, creating a melt pool. The feedstock is supplied to the melt pool and is also melted. The laser beam is usually directed substantially at the interface between the feedstock and the substrate. The melted feedstock is fused to the substrate. Laser metal deposition may e.g. be used for 3D printing or cladding.

The laser metal deposition process may be monitored to check whether the deposited feedstock has a desired quality. For example, in a 3D printing process with laser metal deposition, monitoring may help to check whether a layer, and therefore the 3D object, is being built correctly. A way to monitor a laser metal deposition process may be to use one or more cameras and then inspect the images.

However, the quality of the images may be insufficient. For example, due to the presence of the laser beam there may be excessively bright or dark spots in the images. Reflections may also deteriorate the image, thereby hindering or even precluding a suitable monitoring.

The present disclosure aims at improving the monitoring of laser metal deposition processes which use cameras for the monitoring.

SUMMARY

In an aspect of the present disclosure, a laser device for laser metal deposition on a substrate is provided. The laser device comprises: a delivery opening for delivering a wire or powder metallic feedstock to the substrate and a laser beam source configured to fuse the metallic feedstock with the substrate. The laser beam source is configured to emit a laser beam of a first power. The laser device further comprises a plurality of cameras configured to record images of a region of interest. The laser device further comprises one or more light sources configured to intermittently illuminate the region of interest. The light sources are configured to illuminate with a second power higher than a power of a blackbody radiation emitted during laser metal deposition.

According to this aspect, a laser device comprises a plurality of cameras for recording images of a region of interest. One or more light sources may be used to illuminate at least a portion of the region of interest with light of a higher power than a power of a blackbody radiation emitted during laser metal deposition.

Therefore, the quality of the recorded images may be improved and the monitoring of a laser metal deposition process may be more precise and reliable. By illuminating only intermittently, the process of melting the substrate and feedstock may not be influenced.

Throughout this disclosure, blackbody radiation may be understood as thermal electromagnetic radiation emitted by the metallic feedstock and the substrate when a laser beam emitted by the laser beam source illuminates and heats them during laser metal deposition. Thermal electromagnetic radiation may be the electromagnetic radiation emitted by an object because of its temperature. I.e., the metallic feedstock and the substrate already emit thermal electromagnetic radiation without being illuminated by the laser beam source because they are at a non-zero temperature. But when the metallic feedstock and the substrate are illuminated by the laser beam source during laser metal deposition, they heat up and emit much more thermal radiation.

In some examples, the region of interest may be or may include a region in which the metallic feedstock is being fused on the substrate. In some examples, the region of interest may be or may include a region in which the metallic feedstock has already been deposited. In some examples, the region of interest may include the metallic feedstock.

Optionally, the laser beam device may be configured to generate three-dimensional (3D) images. This may help to better understand what is happening in the region of interest, for example what are the features, e.g. dimensions, of a weld pool formed and/or how well aligned the metallic feedstock is with a laser beam emitted by the laser beam source.

Optionally, the laser beam device may comprise a nozzle for delivering the metallic feedstock. The laser beam device may further comprise a nozzle position adjuster configured to adjust the position of the nozzle with respect to the laser beam device based at least in part on the recorded images of the region of interest. If it is detected that an alignment between the metallic feedstock and a laser beam emitted by the laser beam source may be improved, the nozzle position adjuster may perform such an alignment in an automatic way. Such an adjustment may take place before laser metal deposition or after.

Optionally, the device may be configured to adjust a laser metal deposition process, e.g. one or more laser metal deposition parameters, at least partially based on the images recorded by the plurality of cameras. A laser metal deposition process may therefore be controlled and optimized in view of the monitoring performed by the cameras of the laser device.

The substrate may herein be regarded as the base or material on which feedstock is to be deposited. The substrate may in particular include previously deposited feedstock.

In a further aspect of the disclosure, a method for laser metal deposition on a substrate is provided. The method comprises delivering a wire or powder metallic feedstock through a delivery opening of a laser metal deposition device and fusing the metallic feedstock with the substrate with a laser beam of a first power emitted by a laser beam source. The method further comprises illuminating a region of interest intermittently with a light of a second power higher than a power of a blackbody radiation emitted during laser metal deposition. The method further comprises recording images of the region of interest while the region of interest is illuminated.

Intermittent illumination with the light source may facilitate obtaining good quality images without affecting, or at least with a reduced effect on, the laser metal deposition process.

Optionally, the method may further comprise generating three-dimensional images of the region of interest. In some examples the region of interest may comprise, e.g. may be, a region in which the metallic feedstock is fusing with the substrate. In some of these examples, the region of interest may include the weld pool formed.

One or more laser metal deposition parameters may be optionally adjusted after detecting a need for adjustment based on the images recorded. For example, adjusting may comprise adjusting the position of an opening through which the metallic feedstock is delivered with respect to the laser device.

In yet a further aspect of the present disclosure, a laser device for laser metal deposition on a substrate is provided. The laser device comprises: a delivery opening for delivering a wire or powder metallic feedstock to the substrate and a laser beam source configured to fuse the metallic feedstock with the substrate. The laser beam source is configured to emit a laser beam of a first wavelength range. The laser device further comprises a plurality of cameras configured to record images of a region of interest. The laser device further comprises one or more light sources configured to intermittently illuminate the region of interest. The laser device further comprises one or more optical filters arranged in a field of view of one or more of the cameras, wherein the optical filters are configured to filter light of the first wavelength range. Alternatively, or additionally the one or more light sources may be configured to emit light of a second wavelength range. The optical filters may be configured to only allow the passage of light substantially corresponding to the second wavelength range.

Examples according to this further aspect involving one or more optical filters may also be combined with examples according to the first aspect specifying sufficient illumination power.

DETAILED DESCRIPTION OF EXAMPLES

Figure 1:
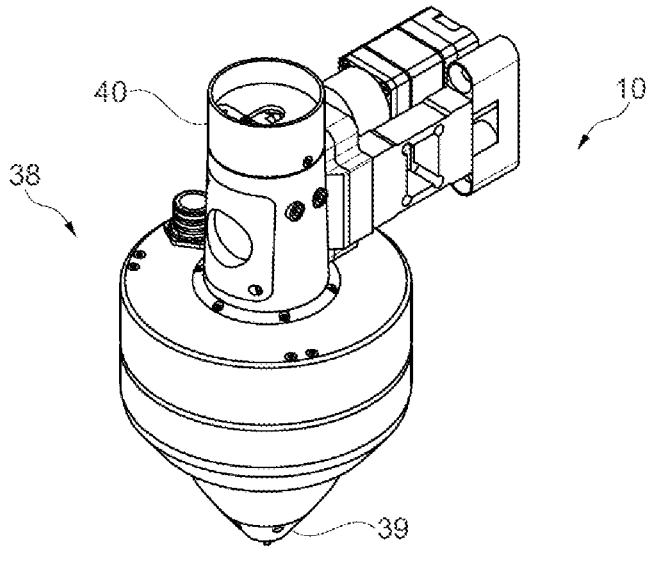
FIGS. 1 and 2 illustrate a perspective view and a side view of an example of a laser device, respectively.

Reference will now be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

According to a first aspect of the disclosure, a laser device for laser metal deposition on a substrate is provided. The laser device comprises a delivery opening for delivering a wire or powder metallic feedstock to the substrate. The laser device further comprises a laser beam source configured to fuse the metallic feedstock with the substrate. The laser beam source is configured to emit a laser beam of a first power. The laser device further comprises a plurality of cameras configured to record images of a region of interest. The laser device further comprises one or more light sources configured to illuminate the region of interest intermittently, e.g. a region in which the metallic feedstock is being and/or has been deposited on the substrate during laser metal deposition. The one or more light sources are configured to illuminate with a second power higher than a power of a blackbody radiation emitted during laser metal deposition.

Figure 2:
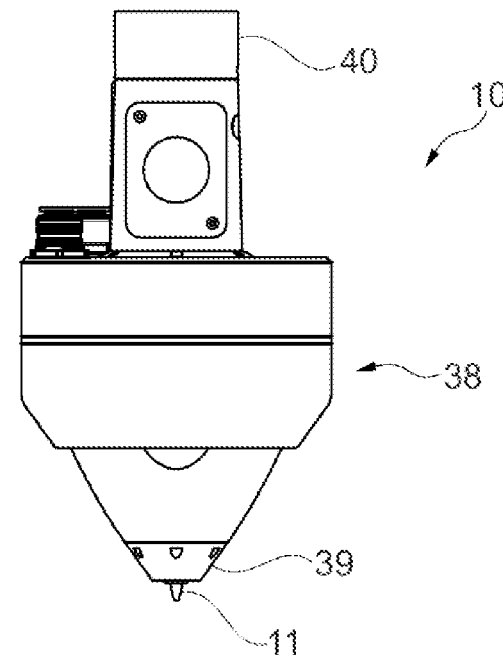

A perspective view and a side view of an example of a laser device 10 are shown in FIGS. 1 and 2, respectively. The laser device 10 may be a print head for a laser metal deposition (LMD) machine or system. The laser device 10 may therefore be relatively compact and usable with one or more different LMD machines or systems (not shown). The laser device 10 may be electrically and mechanically connected to a suitable LMD machine or system, e.g. a robot. In other examples, the laser device 10 may be integrated in the LMD machine or system and may not be removable from the LMD machine or system. The laser device 10 may operate in an open-air or in an inert atmosphere environment.

The laser device 10 may comprise multiple internal channels (not shown) for providing coolant and/or shield gas besides a metallic feedstock. In some examples, a metallic feedstock may be provided through a guide tube 12, see e.g. FIG. 3. The laser device 10 may further comprise collimation and focusing optics 41, see e.g. FIG. 3.

The laser device 10 may comprise a housing 38 enclosing one or more laser beam sources, a plurality of cameras one or more light sources and other components such as collimation and focusing optics, coolant and/or shield gas channels. The laser device 10 may comprise a nozzle cowling 39 in some examples. The nozzle cowling 39 may be removable and, in examples where shield gas is used, the nozzle cowling 39 may help to distribute the shield gas. A shield gas may e.g. be argon, nitrogen or a mixture of gases. A shield gas may include gases that are consumed in the process.

The housing 38 may comprise a coupling neck 40 for connecting and disconnecting the laser device 10 to a LMD machine or system. Connection may e.g. be mechanical and electrical. Connection may also be optical, e.g. through fiber-optic cable. The coupling neck 40 may allow the laser device 10 to be coupled to coolant and/or shield gas supply lines. In some examples, the coupling neck 40 may allow the laser device 10 to be coupled to a metallic feedstock line.

A nozzle 11 for delivery of feedstock, e.g a metal wire or powder is provided substantially along a central longitudinal axis of the laser device 10. In some examples, a metallic wire is fed along the central longitudinal axis.

In some examples, the laser device 10 may include a plurality of off-axis laser beam sources. For example, 6 or 9 or any other suitable number of laser beam sources may be used. In some examples, the laser beam sources may all be the same, emitting laser beams (or configured to emit laser beams) of the same wavelength and with the same power. In other examples, different laser beam sources may be combined. The plurality of laser beam sources may have a substantially common focal point. In a laser metal deposition process, the common focal point may be at or near the interface between the metallic feedstock and the substrate. The points of intersection of the plurality of laser beams at the interface of substrate and feedstock may be directly adjacent to each other. The points of intersection may be regularly distributed along an imaginary 360° circle.

Figure 3:
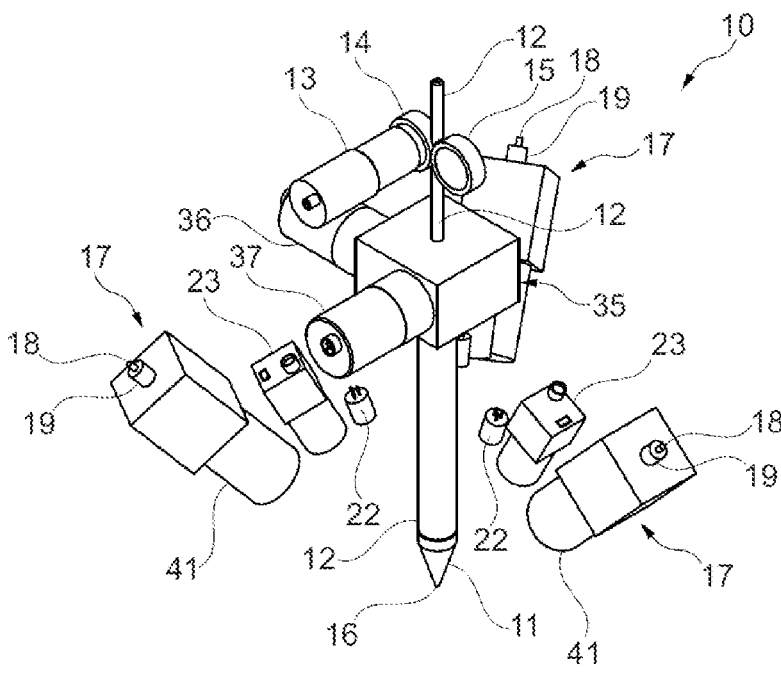
FIGS. 3 and 4 illustrate a perspective view and a side view of an example of a schematic mechanical layout of a laser device, respectively.
Figure 4:
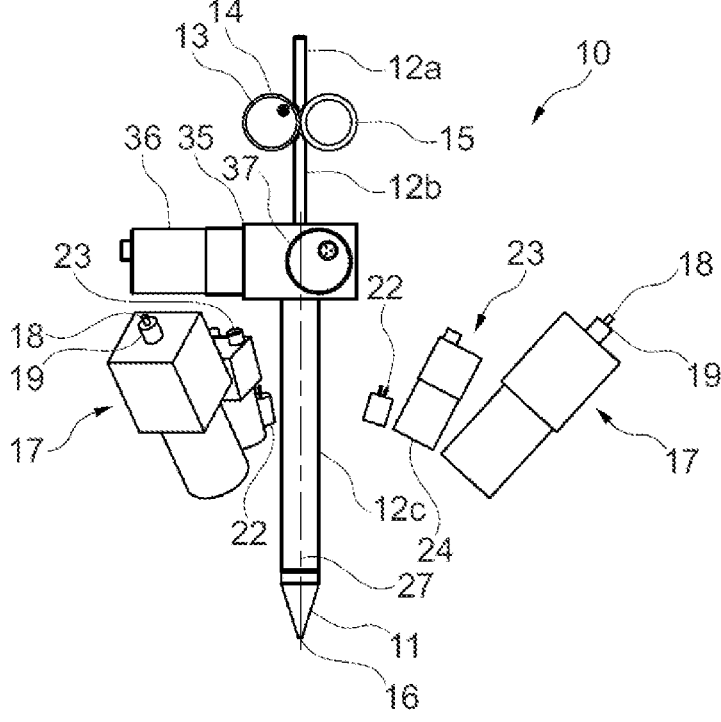

A perspective view and a side view of an example of a schematic mechanical layout of a laser device 10 are shown in FIGS. 3 and 4 respectively. The laser device may be the laser device shown in FIGS. 1 and 2, for example. The housing of the laser device is omitted in these figures for more clearly showing the elements of the laser device 10 relevant for this disclosure.

The laser device 10 of the examples of FIGS. 3 and 4 comprises a wire spool (not shown) around which a metallic wire is wound. In other examples, the wire spool may be provided outside the laser device. The metallic wire enters a wire guide tube 12. The wire spool may be arranged above or besides the top end of the wire guide tube 12. The wire guide tube 12 is configured to guide the metallic wire towards a nozzle 11.

The wire guide tube 12 may be divided in a plurality of portions. The example of FIGS. 3 and 4 illustrates three parts of the guide tube 12: a top part 12*a*, a middle part 12*b* and a bottom part 12*c*. There is a gap between the top part 12*a* and the middle part 12*b*. The laser device 10 further comprises a wire feed motor 13 and a wire drive wheel 14 operatively connected to the wire feed motor 13 for causing the metallic wire to move towards the nozzle 11. The laser device 10 comprises a wire idler wheel 15 configured to be tensioned against the metallic wire to aid in guiding the metallic wire. The nozzle 11 is coupled with the wire guide tube 12. The nozzle 11 comprises a delivery opening 16 through which the metallic wire is supplied.

The laser device 10 of this example further comprises a plurality of laser beam sources 17, in particular three laser beam sources 17. In other examples, the laser device 10 may comprise one, two, four or other number of laser beam sources, e.g. six or nine laser beam sources. In the example of FIGS. 1 and 2, the laser beam sources 17 are fiber coupled lasers. The laser beam sources 17 comprise a laser fiber connector 19 to which a laser fiber 18 can be connected. In other examples, the laser beam sources may be direct diode lasers (i.e. fiber-free lasers), e.g. solid state diode lasers or diode pumped solid state lasers. The laser beam sources 17 include laser collimating and focusing optics 41.

In some examples, all the laser beam sources 17 may be configured to emit a laser beam within a same wavelength range, e.g. between 800 and 900 nm. In other examples, different laser beam sources 17 may be configured to emit laser beams in different or partially overlapping wavelength ranges. For instance, one or more laser beam sources 17 may be configured to emit laser beams in a wavelength range of e.g. 800 to 900 nm whereas one or more other laser beam sources 17 may be configured to emit laser beams in a wavelength range of e.g. between 400 and 550 nm.

In some examples, the one or more laser beam sources 17 may be configured as insertable laser beam sources. I.e., the laser beam sources 17 may be arranged and secured within suitable openings or receptacles of the laser device 10. The housing 38 may then cover the laser beam sources 17.

Figure 5:
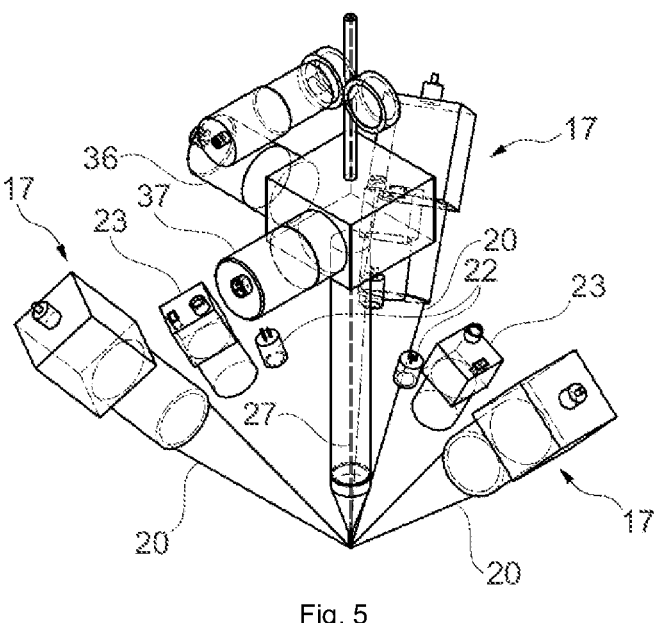
FIG. 5 schematically illustrates the laser beam sources of figure emitting a laser beam.

FIG. 5 schematically shows the laser beam sources 17 of FIG. 3 emitting a laser beam 20. The laser device 10 is configured such that the laser beams 20 converge on the metallic wire supplied through the delivery opening 16 of the nozzle 11, preferably substantially at an interface between the metallic wire and the substrate, such that a portion of the energy is directed to the substrate for melting the substrate and creating a weld pool, and a portion of the energy is directed to metallic wire for melting the metallic wire.

Figure 6:
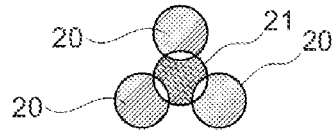
FIG. 6 schematically illustrates an example of a view of the overlap between three laser beams and the metallic wire projected onto the substrate.

FIG. 6 schematically shows an example of a view of the overlap between the laser beams 20 and the metallic wire 21 projected onto the substrate. Each of the three laser beams 20 is impinging on a wire end portion, in particular on a wire tip portion, for melting the wire and fusing it with the substrate.

The laser device 10 of the example of FIGS. 3 and 5 comprises three light sources 22. In other examples, the laser device may comprise a different number of light sources, e.g. one, two, four, six or nine light sources. The light sources may be laser beam sources in some examples, i.e. they may be configured to emit laser beams. The light sources 22 are configured to illuminate with a power higher than a power of a blackbody radiation emitted during laser metal deposition. In some examples, the light sources 22 may also be configured to illuminate with a power higher than the power of the laser beams 20.

According to the first aspect of the disclosure, the laser beam source 17 may be configured to emit a laser beam having a first wavelength and the one or more light sources 22 may be configured to emit light of a second wavelength. The second wavelength may be different from the first wavelength. The wavelength of the laser beam 17 may be chosen such that it is absorbed well by the feedstock, e.g. a metallic wire 21, and therefore facilitating its heating and melting. Or, in other words, the material of the wire 21 may be chosen such that it effectively and efficiently absorbs the energy of the laser beam source 17.

By choosing a different wavelength for the light emitted by the light source 22, the recorded images of a region of interest, e.g. of the melt pool, may not be affected, or less affected, than if the wavelength of the light emitted by the light source 22 was the same than the wavelength of the laser beam 20. I.e., the recorded images may be unaffected by the laser beams 20 emitted by the laser beam sources 17. In some examples, the laser beam source 17 may be configured to emit a laser beam having a wavelength between 800 nm and 900 nm, e.g. of 850 nm, and the light source 22 may be configured to emit light having a wavelength below 800 nm, e.g. between 600 and 700 nm, or above 900 nm.

This may similarly apply if the laser device 10 comprises a plurality of laser beam sources and a plurality of light sources. For example, all the laser beam sources 17 of the example of FIGS. 3 and 4 may be configure to emit laser beams having a certain first wavelength and all the light sources 22 may be configured to emit light having a certain second wavelength which is different from the first wavelength.

In some examples, the laser device 10 may comprise one or more optical filters (not shown) for filtering a wavelength of the laser beams 20 emitted by the one or more laser beam sources 17. For instance, one or more optical filters may be arranged in an image path 25, see FIG. 7, of each camera 23. The one or more optical filters may be configured to filter e.g. wavelengths corresponding to the wavelength of the laser sources used for melting material, e.g. between 800 and 900 nm. The one or more optical filters may additionally or alternatively be configured to specifically allow light according to the wavelength of the illumination source pass.

Figure 7:
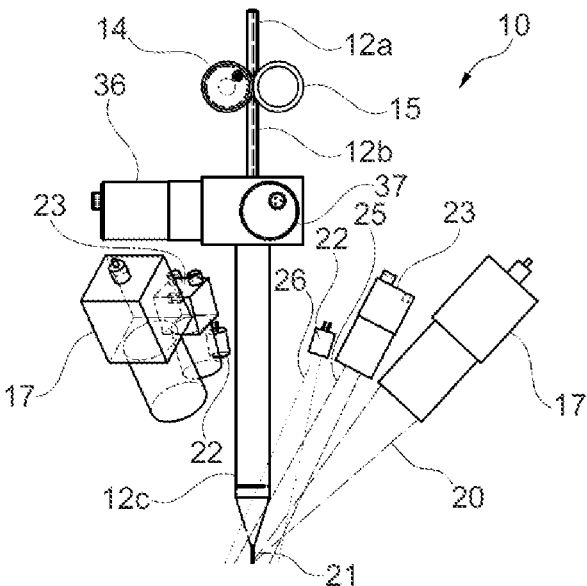
FIG. 7 schematically illustrates a side view of an example of an optical layout of the laser device of FIGS. 3 and 4.

In the example of FIGS. 3 and 4, the laser device 10 comprises three cameras 23. The cameras 23 include camera objectives 24. FIG. 7 schematically illustrates an example of an optical layout of the laser device of FIGS. 3 and 4. FIG. 7 schematically illustrates an image path 25 of a camera 23 and an illumination path 26 of a light source 22 next to a laser beam 20. The laser device 10 is configured to cause the laser beam(s) 20, the illumination path(s) 26 and the image path(s) 25 to overlap on a same area or region. The area or region illuminated by the light source(s) 22 may exceed the area or region provided by the image path 26 in some examples.

Figure 8:
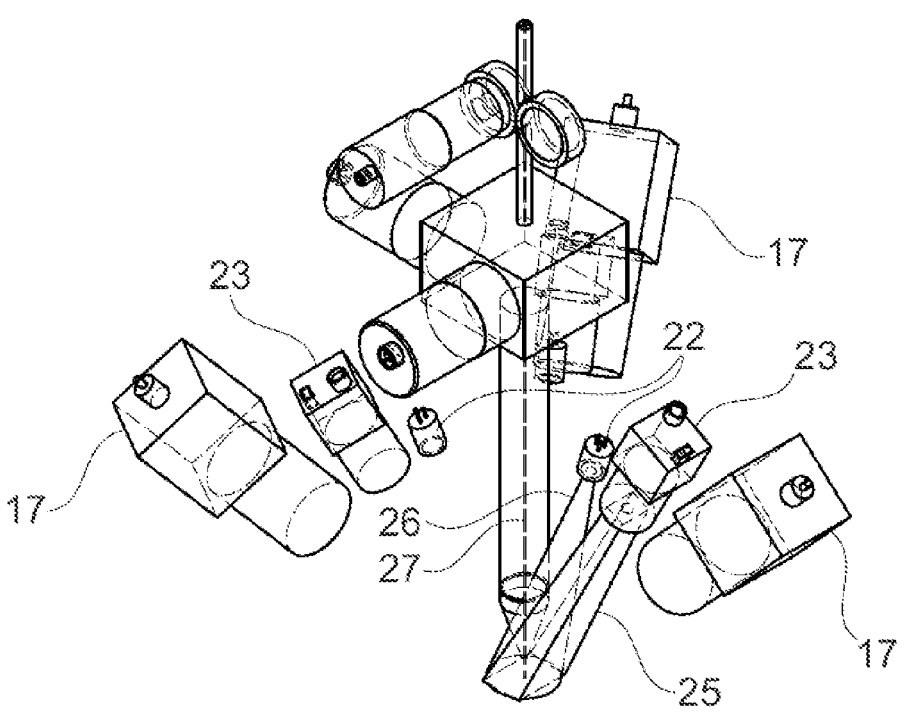
FIG. 8 schematically illustrates an example of an overlapping between an illumination path and an image path of the laser device of FIGS. 3 and 4.

The laser device 10 is therefore configured to emit one or more laser beams 20 to fuse the feedstock, e.g. a metallic wire 21, with the substrate; one or more light sources 22 are configured to illuminate a region of interest, e.g. the region in which fusing is taking or is to take place; and two or more cameras 23 are configured to record images of the region. FIG. 8 schematically illustrates an example of an overlapping between an illumination path 26 and an image path 25 of the laser device 10 of the example of FIGS. 3 and 4.

In general, the cameras 23 may be configured to record images at overlapping periods of time according to the first aspect of the disclosure. In examples, the plurality of cameras 23 may be synchronized, such that images are recorded from different angles at the same time. In examples, individual light sources 22 and cameras 23 may be synchronized, such that recording of images and illumination may be carried out at the same time.

Figure 9:
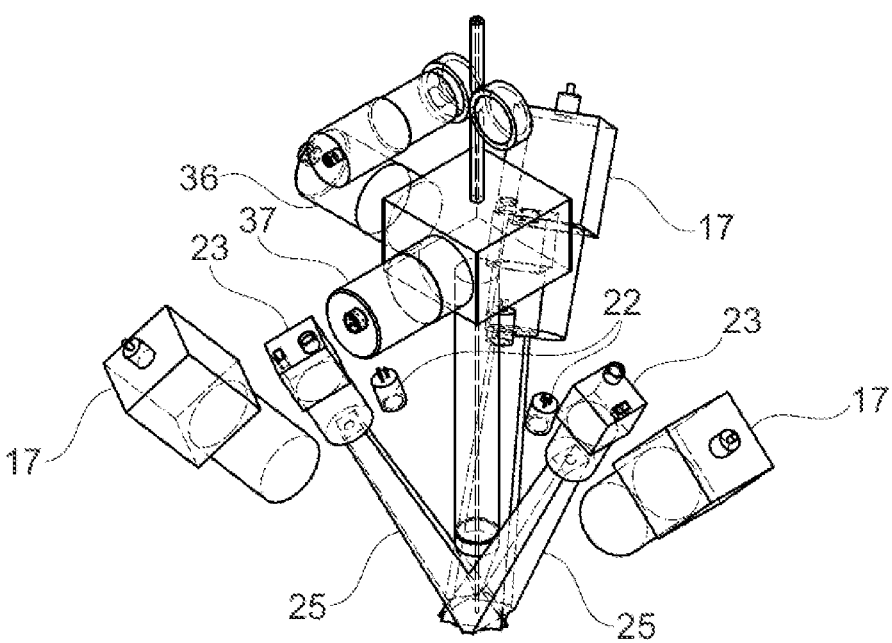
FIG. 9 schematically illustrates an example of an overlapping between two image paths of the laser device of FIGS. 3 and 4.

As the laser device 10 may move with respect to the substrate, information of what is happening at a certain moment from different perspectives, angles or directions may be obtained and put together for having a more complete vision of the LMD process. The images may be superimposed for obtaining a 3D image of the imaged region. FIG. 9 schematically illustrates an example of an overlapping between two image paths 25 of the laser device 10 of the example of FIGS. 3 and 4.

A camera 17 and the light source 22 may be arranged together, e.g. on a common support. Arranging a light source 22 together with a camera 23 may provide better illumination conditions for recording images with the camera 23. A light source 22 may be arranged near a camera 23 in a same module or portion of the laser device 10. If the laser device 10 comprises e.g. three cameras 23 and three light sources 22, such as in the example of laser device of FIGS. 1 and 2, each light source 22 may be arranged in proximity of a corresponding camera 23. The illumination conditions for recording images of a region of interest may be more homogeneous. The laser device 10 may comprise a same number of light sources 22 than a number of cameras 23. The light sources 22 and the cameras 23 may be arranged in light source—camera pairs.

The laser device 10 may similarly comprise a same number of laser beam sources 17 as a number of cameras 23 and light sources 22. The light sources 22, the cameras 23 and the laser beam sources 17 may be arranged in light source—camera—laser beam source trios, e.g. they may be arranged on a common support.

The laser beam source(s) 17 may be off-axis laser beam source(s) spaced, e.g. regularly spaced, about a longitudinal central axis 27 of the laser device 10, see e.g. the example of FIG. 5. Off-axis herein refers to the laser beams not being parallel to the longitudinal central axis of the laser device and optionally also the wire. The light source(s) 22 may be off-axis light sources spaced, e.g. regularly spaced, about the longitudinal central axis 27 of the laser device 10. A regular spacing may facilitate recording suitable images for later overlapping them and building a 3D image as well as for recording good quality images. For example, light source—camera pairs or light source—camera—laser beam source trios may be regularly spaced around the longitudinal central axis 27 of the laser device 10.

The plurality of cameras may be global shutter cameras. Global shutter cameras may allow shutter times which are short enough to accommodate short exposure times of the one or more light sources 22. For example, global shutter cameras may allow shutter times between 3 and 10 microseconds.

The frequency of recording of images may be e.g. more than 10 Hz, and may be e.g. around 24 frames per second.

Figure 10:
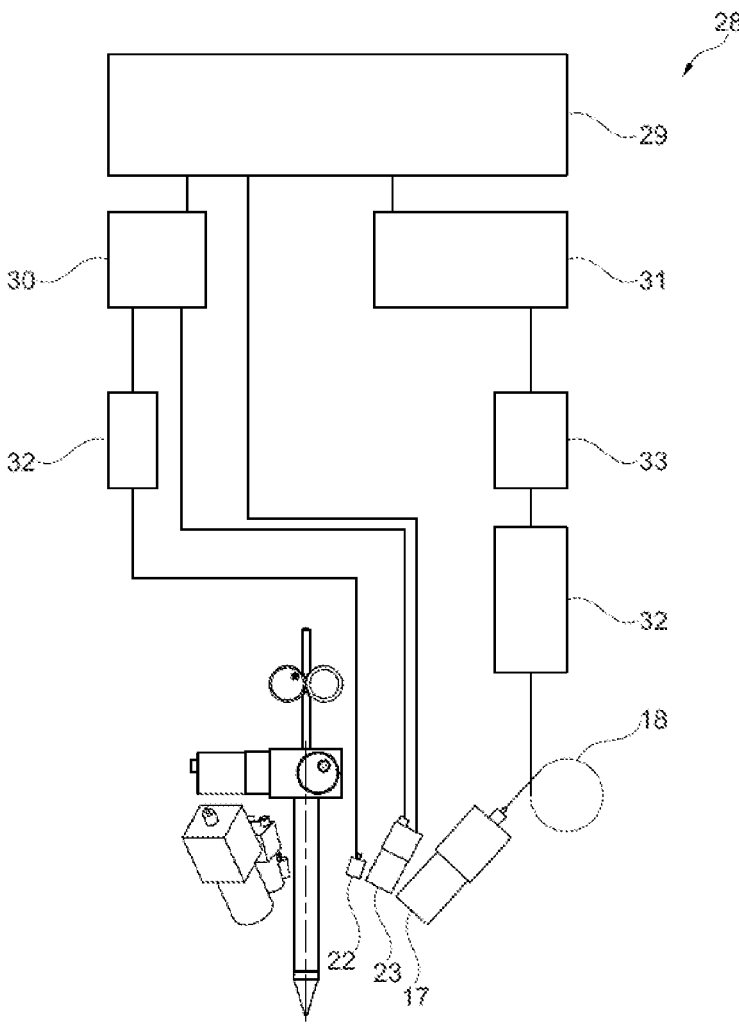
FIG. 10 schematically illustrates an example of a control architecture for the laser beam sources, the cameras and the light sources of the laser device of FIGS. 3 and 4.

FIG. 10 schematically illustrates an example of a control architecture 28 for the laser beam sources, the cameras and the light sources of e.g. the laser device of the example of FIGS. 3 and 4. The straight lines refer to connections, e.g. electrical connections, between two components. The laser device 10 comprises, in this example, a processor 29, e.g. a main processor. The processor 29 is electrically connected to a trigger programmable logic controller (PLC) 30, to the cameras 23 and to a laser device control PLC 31. The processor 29 is configured to receive image signals from the cameras 23.

The laser device 10 may be configured to generate 3D images from the images recorded by the plurality of cameras 23. The processor 29 may comprise an imaging processing module configured to combine images recorded by the cameras, e.g. images recorded from different directions, angles or perspectives at a same time, and generate a 3D image.

The trigger PLC 30 is configured to control the illumination of the one or more light sources 22, e.g. when and how long to illuminate. A light source driver 32 is arranged between the trigger PLC 30 and the one or more light illumination sources 22. The trigger PLC 30 is also configured to control the cameras 23, e.g. when and how long to expose the cameras 23. The trigger PLC 30 may e.g. synchronize the illumination provided by the light sources 22 and the recording of images by the cameras 23. The cameras 23 may e.g. have exposure times about three microseconds.

In the example of FIG. 10, the laser fiber 18 is electrically and mechanically connected to a laser diode 32. As explained previously, fiber-free laser beam sources may be used in other examples. A laser driver 33 is provided between the laser device PLC 31 and the laser diode 32. The machine control PLC is configured to control the laser beam sources 17, e.g. when a laser beam is emitted and for how long.

Accordingly, the processor 29 is able to control the laser beam sources 17, the cameras 23 and the light sources 22.

Referring again to the example of FIGS. 3 and 4, the laser device 10 comprises a nozzle position adjuster 35. I.e., in some examples the laser device 10 may comprise a nozzle position adjuster 35 which is configured to adjust the position of the nozzle 11 with respect to one or more laser beam sources 17. The adjustment of the nozzle 11 may be at least based on the recorded images. In this manner, the position of the metallic wire 21 may be varied and the locations at which one or more laser beams impinge on the wire 21 may be adapted for an optimized laser beam procedure. An aspect of using a metallic wire 21 is that a wire may be relatively easily identified when processing the images recorded by the cameras. Proper alignment of the wire may thus be monitored and corrected if necessary. Adjustment of the nozzle 11 or adjustment of the position of the wire may include processing the recorded images to identify the wire 21. Identification of the wire 21 may be based on object recognition techniques.

For example, the portion of the wire delivered by the nozzle 11 may be easily identified, e.g. by locating the ends of such portion of the wire. Changes in such portion of the metallic wire, e.g. changes in the ends of such portion of the metallic wire, maybe tracked with the recorded images.

If other suitable metallic feedstock, e.g. metallic powder, is used, a nozzle position adjuster 35 may be similarly used for reliably controlling where the metallic powder is fed.

In the examples of FIGS. 3 and 4, the nozzle position adjuster 35 is arranged between the middle part 12*b* and the bottom part 12*c* of the guide tube 12 for guiding the metallic feedstock. The nozzle position adjuster 35 comprises a first motor 36 and a second motor 37. The first motor 36 is configured to move the guide tube 12, e.g. a top portion of the bottom part 12*c* of the guide tube, see e.g. FIG. 5, in a first direction substantially perpendicular to the longitudinal central axis 27 of the laser device 10. The second motor 37 is configured to move the guide tube 12, e.g. a top portion of the bottom part 12*c* of the guide tube, see again e.g. FIG. 5, in a second direction substantially perpendicular to the longitudinal central axis 27 of the laser device 10 and to the first direction.

The longitudinal central axis 27 of the laser device may for example be parallel to a vertical direction (e.g. z direction), and the first 36 and second 37 motors may be configured to move the bottom part 12*c* of the guide tube 12 in two perpendicular directions (e.g. x and y directions). As the nozzle 11 is connected, e.g. attached, to a bottom portion of the bottom part 12*c* of the guide tube 12, the nozzle 11 may be moved when the bottom part 12*c* of the guide tube 12 is moved by one or both of the first 36 and second 37 motors.

Figure 11:
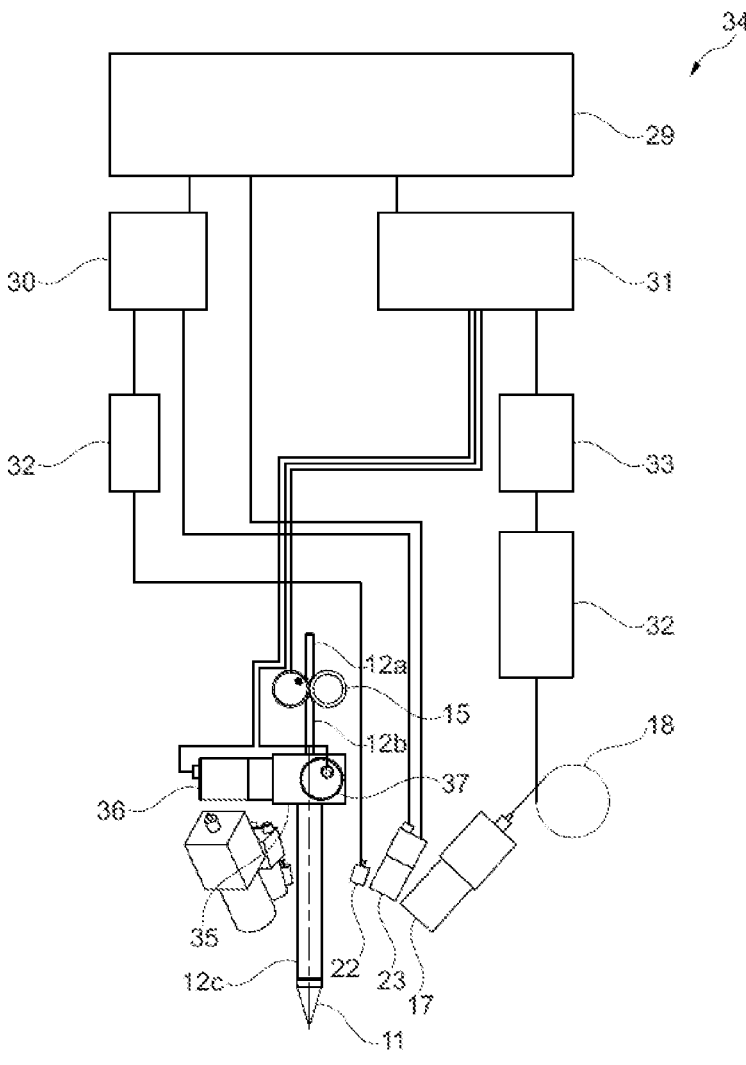
FIG. 11 schematically illustrates an example of a control architecture for the laser device of FIGS. 3 and 4.

FIG. 11 schematically illustrates another example of a control architecture 34 for the laser device 10. The control architecture for the laser beam sources 17, the cameras 23 and the light sources 22 is the same as in FIG. 10, and therefore the description of FIG. 10 also applies to FIG. 11. The control architecture 34 of the example of FIG. 9 further includes the controlling of the position of the nozzle 11.

The laser device PLC 31 is further electrically connected to the first motor 36 and the second motor 37 of the nozzle position adjuster 35. If the images recorded by the cameras 23 and e.g. processed and analyzed by the processor 29 indicate that an alignment between the metallic feedstock, e.g. metallic wire 21, and one or more laser beams 20 is not good or sufficiently good, the laser device PLC 31 may signal the first 36 and/or the second 37 motors of the nozzle position adjuster 35 to move the bottom part 12*c* of the guide tube 12, and therefore the nozzle 11. The adjustment of the position of the nozzle 11 may therefore be automatically performed.

The laser device 31 is further electrically connected to the wire feed motor 13 in the example of FIG. 9. Alternatively or in addition to adjusting the position of the nozzle 11, the laser device 10 may be configured to modify a speed at which the metallic feedstock is delivered. Depending on the data gathered by the cameras 23, the laser device 10 may automatically adjust such speed. For example, based on a 3D image of the weld pool, the speed at which the metallic feedstock is delivered, may be automatically adjusted.

The laser device 10 may further comprise at least a memory (now shown). The memory may comprise instructions that, when executed by one or more processors, e.g. processor 29, cause the one or more processor to perform one or more actions, e.g. activating or deactivating one or more laser beam sources 17, activating or deactivating one or more light sources 22 or activating or deactivating one or more cameras 23.

Figure 12:
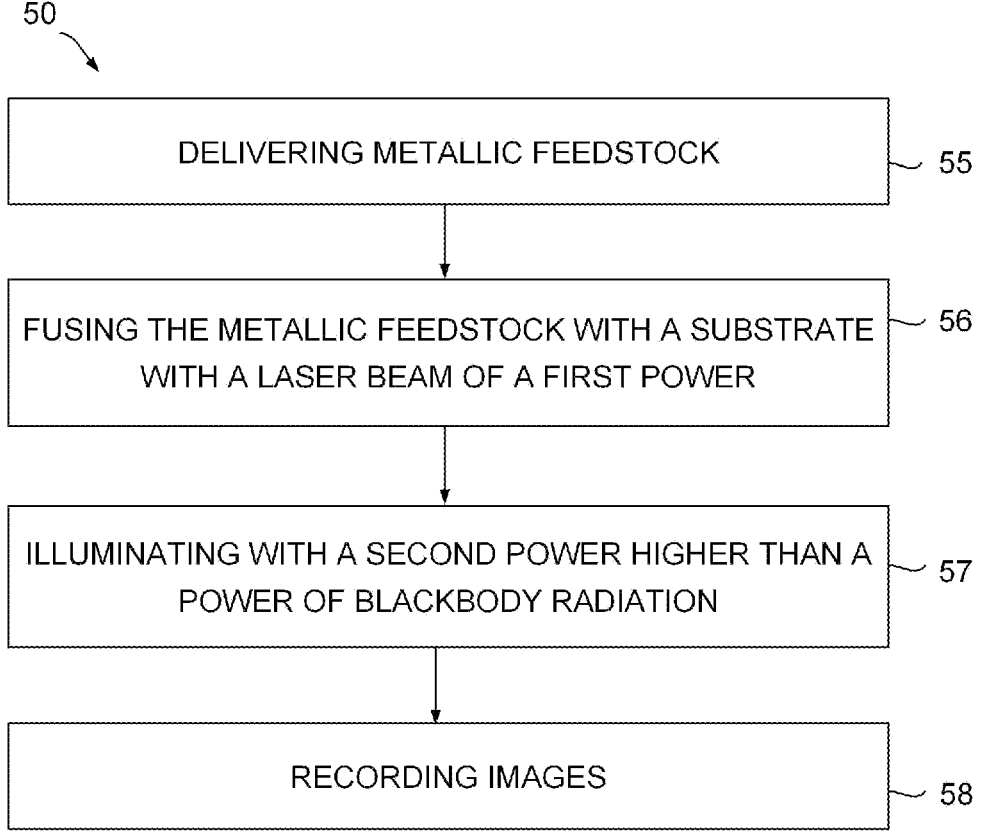
FIG. 12 shows a flow chart of a method for laser metal deposition on a substrate.

According to a further aspect of the disclosure, a method 50 for laser metal deposition on a substrate is provided. The method is schematically shown in the flow chart of FIG. 12. The laser device 10 described throughout this disclosure may be used to perform the steps of this method. The method comprises, at block 55, delivering a wire or powder metallic feedstock. The method further comprises, at block 56, fusing the metallic feedstock with the substrate with a laser beam 20 of a first power emitted by a laser beam source 17. The method further comprises, at block 57, illuminating a region of interest intermittently, e.g. a region in which the metallic feedstock is fusing with the substrate, with a light of a second power higher than a power of a blackbody radiation emitted during laser metal deposition. The method further comprises, at block 58, recording images of the region of interest while the region of interest is illuminated.

As previously explained, good quality images of the laser metal deposition process may be obtained in this manner by illuminating 57 and recording images 58 at an overlapping time period. The overlapping may be partial in some examples. For example, good quality 3D images may be obtained. The LMD process may be monitored in a more precise, reliable and effective manner. One or more adjustments may be made to the LMD process based on the images recorded. An intermittent illumination may limit a possible interference with the LMD process.

The illumination with one or more light sources 22 may be performed at periodic intervals in some examples, although the illumination may be aperiodic in other examples. In this context an interval may be the time between one light source 22 starts to illuminate and the light source 22 starts to illuminate again. An interval may have a duration of between 20 microseconds and 200 microseconds, e.g. 50 microseconds, or 100 microseconds in some examples. In this way, a light source 22 may start illumination e.g. each 100 microseconds. If there is a plurality of light sources 22, all the light sources may start to illuminate at a same time in some examples.

The region of interest may be illuminated during 3 to 10 microseconds. For example, the illumination of a light source 22 may last 4 to 8 microseconds. For instance, each time a light source 22 starts illumination, illumination may last for 5 microseconds. One or more cameras 23 may be configured to record an image during e.g. 3 microseconds which overlap with the illumination of the light source(s). If there is a plurality of light sources 22, all the light sources may have illuminate during a same period of time.

Starting the illumination of the light sources 22 at the same time and for a same duration for all the light sources may help to monitor in a same manner a desired region of interest from different directions. This may also facilitate to obtain 3D images of a good quality.

In other examples, the frequency of illumination may vary between light sources 22. For example, one or more first light sources may start to illuminate each 500 microseconds while one or more other second light sources may start to illuminate each 250 microseconds. Similarly, the frequency of imaging may vary between cameras 23. For example, one or more first cameras may be configured to record images when the first light sources illuminate, and one or more other second cameras may be configured to record images when the other second light sources illuminate. If it is suspected that e.g. a portion of a metallic wire feedstock may be heated more than other portion of the metallic wire feedstock, the frequency of illumination and image capture may be higher for the light source(s) and camera(s) directed to the problematic area.

In some examples, the second power, i.e. the power with which one or more light sources 22 illuminate, may also be higher than the first power, i.e. the power of one or more laser beams 20.

The power of the laser beams 20 emitted by the laser beam source 17 (or a plurality of laser beam sources 17) may be between 100 W (watts) and 5000 W in some examples. The power of the blackbody radiation during laser metal deposition may e.g. be between 1 W and 50 W. In these examples, the power of the light emitted by the one or more illumination sources 22 may e.g. be at least two times the power of the blackbody radiation, e.g. between 2 W and 100 W.

The method may further comprise generating 3D images of the region of interest, e.g. of a region in which the metallic feedstock is fusing with the substrate. 3D images may provide additional information to the information provided by 2D images. For example, reliable information about the dimensions of the deposited material, e.g. of a height of a deposited layer, may be obtained.

In some examples, a 3D image of the melt pool may be generated. The cameras may record images of the melt pool from different directions such that a 3D image of the melt pool may be generated by the laser device 10. Analyzing a 3D image of the melt pool may be easier and faster than e.g. analyzing information from other sensors such as process force, thermal imaging, optical coherence tomography (OCT) or distance sensors. Certain parameters such as wire position, wire cast and wire helix, nozzle wear and process stability may not be easily and/or reliably monitored with such sensors.

In these or other examples in which the feedstock is a wire 21, a 3D image of an end portion of the metallic wire may be obtained. The interaction between the laser beam 20 and the wire 21 may be monitored in this way. If the laser beam emitted 20 by the laser beam source 17 is not well aligned with the wire 21, the position of the wire 21 may be changed for a better alignment between the wire 21 and the laser beam 20. This may be particularly useful if a plurality of laser beam sources 17 are used. For example, if three laser beam sources are used, a 3D image may show whether all the laser beams are impinging correctly on the wire end portion. It this is not the case, the wire may be moved with respect to the laser beam sources for a correct alignment.

In some examples, one or more images may be recorded with a first exposure time and a first illumination power (of the light emitted by one or more light sources). One or more other images may be recorded with a second exposure time longer than the first exposure time and a second illumination power lower than the first illumination power. In this manner, the first one or more images may help to particularly see what is happening to the wire with improved precision, whereas the second one or more images may help to particularly see what is happening to the laser beam(s). The laser device 10 may be configured to process the first one or more images separately from the second one or more images. The laser device 10 may be configured to overlap information obtained from the first and the second one or more images for precisely and reliably knowing how good the alignment between the wire and the laser beam(s) of the laser beam source(s) is.

Wire alignment may be manual. Laser metal deposition may need to be stopped and the wire may need to be manually adjusted, e.g. by manually moving a wire nozzle 11. In other examples, wire alignment may me automatic. The laser device may be configured to, when detecting a misalignment between the metallic wire and one or more laser beams, move the metallic wire. For example, a nozzle position adjuster 35 may be used as explained before.

In other examples, the alignment between the metallic wire 21 and one or more laser beams 20 may be performed in other suitable manners. For instance, the laser device 10 may in some examples comprise a steerable nozzle for delivering the metallic wire, and the position of the metallic wire may be modified by changing the orientation of the nozzle with respect to the laser device. The nozzle may be movably connected to the laser device, e.g. the nozzle may be tiltable with respect to the laser device.

In general, independently of whether the metallic feedstock is a wire or powder, the position of an opening through which the metallic feedstock is delivered with respect to the laser beam device 10 may be adjusted. In some examples, if a nozzle 11 is used to deliver the metallic powder, the position of the nozzle 11 may be modified in a similar manner as previously explained. The modification may be manual, or the modification may be automatic. The laser device 10 may e.g. detect in a generated 3D image that the nozzle 11 and the laser beam(s) 20 are not sufficiently well aligned, and the laser device 10 may appropriately move the nozzle 11.

The method may further comprise adjusting one or more laser metal deposition parameters after detecting a need for adjustment, e.g. after detecting that one or more correcting actions are needed. For example, one or more of power with which the laser beam source 17 is illuminating (or the power of one or more of the laser beam sources 17 if there is a plurality of laser beam sources), the speed at which the metallic feedstock is delivered, a distance between the substrate and an opening through which the metallic feedstock is delivered, and a speed at which a laser metal deposition device 10 is moved with respect to the substrate may be adjusted.

If a laser device 10 comprises more than one laser beam source 17, the power of the laser beam to be emitted may be adjusted independently for each laser beam source 17 in some examples.

Although in the examples shown in the figures of this disclosure, the metallic feedstock is provided through the longitudinal central axis 27 of the laser device 10 and the one or more laser beam sources 17 are off-axis sources, i.e. they are angled with respect to the longitudinal central axis 27 for emitting laser beams which contact the metallic feedstock and the substrate at a focal point, other arrangements of metallic feedstock and laser beam sources 17 are possible. For example, a metallic wire may be provided off-axis (i.e. angled with respect to the longitudinal central axis 27 of the laser device 10) whereas a laser beam source

17 may be configured to emit a laser beam 20 substantially parallel to the longitudinal central axis 27 of the laser device 10.

Similarly, one or more metallic feedstocks may be used. The laser device 10 may be configured to deliver one or more metallic wires and/or one or more metallic powders, e.g. as explained in the patent application WO 2021/001054 A1.

This written description uses examples to disclose a teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A laser device for laser metal deposition on a substrate, the laser device comprising:
   - a delivery opening for delivering a wire or powder metallic feedstock to the substrate;
   - a laser beam source configured to fuse the metallic feedstock with the substrate, the laser beam source being configured to emit a laser beam of a first power;
   - a plurality of cameras configured to record images of a region of interest; and
   - one or more light sources configured to illuminate the region of interest intermittently;

wherein the one or more light sources are configured to illuminate with a second power, the second power being higher than a power of a blackbody radiation emitted during the laser metal deposition.

2. The laser device of claim 1, wherein the laser beam source is configured to emit a laser beam having a first wavelength, and wherein the one or more light sources are configured to emit light of a second wavelength, wherein the second wavelength is different from the first wavelength.

3. The laser device of claim 1, wherein the laser device is configured to generate a three-dimensional image of the region of interest.

4. The laser device of claim 3 wherein the region of interest comprises a region in which the metallic feedstock is being fused on the substrate during the laser metal deposition.

5. The laser device of claim 1, further comprising one or more optical filters arranged in a field of view of one or more of the cameras, wherein the optical filters are configured to filter light of the first wavelength range.

6. The laser device of claim 1, further comprising a nozzle which includes the delivery opening and further comprising a nozzle position adjuster configured to adjust the position of the nozzle with respect to the laser beam device based at least partially on the recorded images of the region of interest.

7. The laser device of claim 1, wherein the laser device comprises a longitudinal central axis, and wherein the delivery opening is substantially arranged along the longitudinal central axis, and wherein the one or more light sources are off-axis light sources with respect to the longitudinal central axis of the laser device.

8. The laser device of claim 1, wherein the laser device is a print head.

9. The laser device of claim 8, wherein the print head comprises a plurality of laser beam sources for delivering laser beams to a substantially common focal point substantially at an interface between the metallic feedstock and the substrate.

* * * * *